United States Patent [19]

Fernando et al.

[11] Patent Number: 4,966,733
[45] Date of Patent: Oct. 30, 1990

[54] RENDERING PROCESSES

[75] Inventors: Tissa Fernando; Steven E. Dunn, both of Auckland, New Zealand

[73] Assignee: The Meat Industry Research Institute of New Zealand, Hamilton, New Zealand

[21] Appl. No.: 857,003

[22] Filed: Apr. 29, 1986

Related U.S. Application Data

[63] Continuation-in-part of Ser. No. 788,655, Oct. 16, 1985, which is a continuation of Ser. No. 427,632, Sep. 29, 1982, which is a continuation of Ser. No. 194,537, Oct. 6, 1980.

[30] Foreign Application Priority Data

Jun. 21, 1979 [NZ] New Zealand .......................... 190184

[51] Int. Cl.$^5$ ................................................ C11B 1/12
[52] U.S. Cl. .................................. 260/412.6; 260/412; 260/412.7
[58] Field of Search .................... 260/412, 412.6, 412.7

[56] References Cited

U.S. PATENT DOCUMENTS 3,519,662 7/1970 Gruver, Jr. et al. .

FOREIGN PATENT DOCUMENTS 148196 4/1969 New Zealand .
186249 2/1980 New Zealand .
1046642 10/1966 United Kingdom .
1094915 10/1967 United Kingdom .
1126723 9/1968 United Kingdom .

OTHER PUBLICATIONS

948651, Great Britain.

Primary Examiner—Charles F. Warren
Attorney, Agent, or Firm—Nilsson, Robbins, Dalgarn, Berliner, Carson and Wurst

[57] ABSTRACT

A rendering process in which fats and oils are rendered from fat and oil bearing raw materials. The process comprises reducing the particle size of the raw material, heating the reduced raw material in a rendering vessel to a rendering temperature without the introduction of any process water and/or steam while establishing fluidization of the raw material within tallow resident in the rendering vessel and moving a flow of the heated material to a separator.

4 Claims, 1 Drawing Sheet

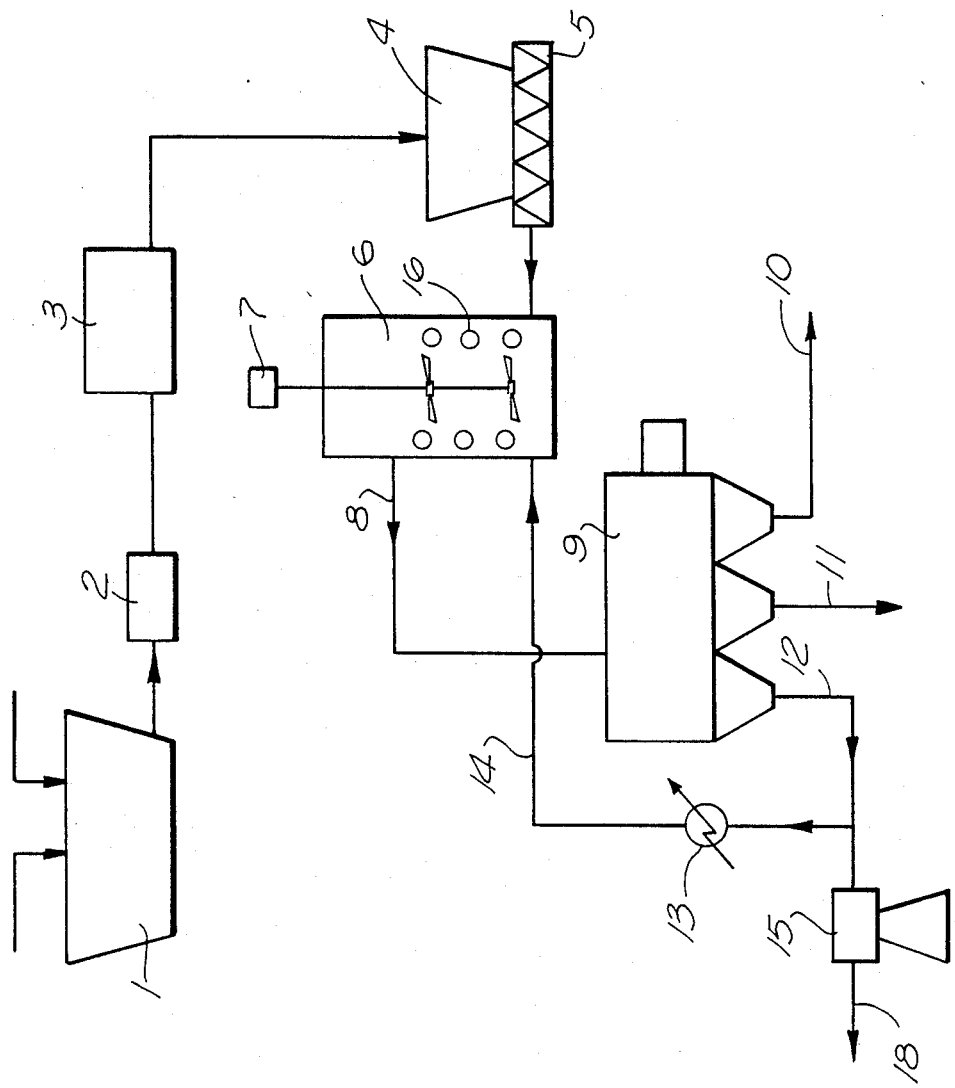

RENDERING PROCESSES

RELATED SUBJECT MATTER

This is a continuation-in-part of Ser. No. 788,655 filed Oct. 16, 1985 and entitled "Rendering Processes", now abandoned, which is a continuation of Ser. No. 427,632 filed Sept. 29, 1982 and entitled "Rendering Processes", which is a continuation of Ser. No. 194,537 filed Oct. 6, 1980 and entitled "Improvements in or Relating to Rendering Processes", now abandoned.

BACKGROUND AND SUMMARY OF THE INVENTION

This invention relates to a rendering process and more particularly to a rendering process for treating animal and/or vegetable material.

The aforementioned materials generally contain two or all of the following phases: fat, fat-free solids, and water. In the case of animal by-products, for example material from slaughter houses, packing houses and the like such as a mixture of beef and mutton offal, the phases after rendering are a liquid phase which consists essentially of fats and oils and a solid phase which consists essentially of meat and bone meal. The solid phase is usually high in protein and processed into animal feed. The liquid phase is separated into tallow and waste process water.

Rendering of animal tissues by heat is carried out presently by two types of processes: dry rendering high temperature (135° C.) and low temperature (70°–100° C.) wet rendering.

In dry rendering, the raw material is heated, separated into the tallow, fat-free solid and water phases and dried in the same operation. This process suffers from several drawbacks: 10–15% residual fat in meal; raw material must be washed thoroughly to ensure that the tallow products is of premium grade; the nutritive value of the meal is downgraded by the high temperature of the process; the process required high grade steam and has a higher energy consumption compared with low temperature rendering systems.

The low temperature rendering systems include: the traditional "digester" type direct steam injection process which produces high losses of product in the stickwater; the Pfaudler process (U.S. Pat. No. 3,519,662) and the Alfa-Laval "Centritherm" and "Centribone" process (N. Z. Patent Specification No. 186249). The latter processes are generally regarded as "wet rendering" as water is introduced into the raw material and live steam is directly injected into the raw material.

The use of steam requires that the processing plant has a facility to raise process steam. In addition the injection of live steam or extra water into the flow of raw material increases the amount of process water and can lead to a high B.O.D. level in the process water so that further separation must take place before the process water can be released into existing sewers and effluent treatment plants.

The main object of the present invention is to provide a low temperature rendering process in which no process water and no live steam is introduced into the raw material being rendered.

In one broad aspect the invention provides a low temperature rendering process for separating animal or vegetable raw material into a fat fraction and at least one protein fraction comprising reducing the particle size of the raw material, feeding the reduced raw material into a rendering vessel, feeding under pressure into the rendering vessel recycled tallow or recycled tallow phase, heating the resultant raw material and tallow mixture by the rendering vessel using heat exchange means, said mixture being heated at a temperature which is in the range of 75° to 100° C., the mixture being subjected to particulate fluidization by the recycled tallow and continuous agitation thereof within the rendering vessel, said heating being carried out without the introduction into the rendering vessel of any process water and live steam and moving a flow of the heated material from the rendering vessel to a separator for phase separation.

Acid can be added to the raw material prior to being comminuted in size. The raw material is preferably acidified to a pH of 3.8 to 4.5.

BRIEF DESCRIPTION OF THE DRAWING

To more fully describe the invention reference will be made to the accompanying drawing which is a schematic flow diagram of one form of the apparatus by which the process of the present invention can be carried out.

DESCRIPTION OF THE ILLUSTRATIVE EMBODIMENT

The raw material which when derived from slaughter houses, packing houses and the like may include fat and oil bearing animal material being tissue, muscle, hide, blood, bone, viscera, offal and the like is fed into a storage bin 1 or directly into a grinder.

In the preferred form of the invention, the plant consists of a raw material holding bin 1 which stores prebroken raw material of approximately 50 mm×50 mm. By means of a spray nozzle or any other suitable device or method, acid can be added to the prebroken raw material in order to preserve the raw material, reduce odour and to contain the free fatty acid content of the tallow produced. The prebroken material passes from holding bin 1 through a metal detector 2 and into a grinder 3, which grinds the raw material through a grinding plate of approximately 18 mm or 12 mm hole size. If required, further acid addition can be carried out at this grinding stage. The ground material is then passed on to a hopper 4 from where it can be pumped by a suitable pump 5 to a rendering vessel 6. Recycled tallow derived from the tallow phase issuing from a separator (as hereinafter described) is also pumped under pressure through the conduit 14 into the lower part of the rendering vessel 6 to thereby create a flow of tallow through the particulate material resident in the rendering vessel 6.

In the preferred form the rendering vessel is a tall non-pressurized cylindrical vessel with an agitator 7 and a heating apparatus in the form of a coil or pipe 16. Turbine propeller type impellers 17 are attached to the agitator 7.

The mixture of recycled tallow/raw material in the rendering vessel is thus heated by the heating apparatus 16 with the heat being derived from indirect steam or any other suitable heat transfer fluid passing through the heating apparatus. This indirect steam or other heat transfer fluid can also be used in a heat exchanger 13 for preheating of the recycle tallow. In addition to being pumped and heated the recycled tallow/raw material is vigorously agitated by the agitator 7 and the impeller blades 17 increase the velocity of the tallow flow through the rendering vessel so as to obtain fluidization of the mixture. The term "fluidization" is where liquid or a gas is moved at sufficient velocity through a bed of particulate material such that the particles become suspended in the flow and move freely among themselves, i.e. they fluidize under the action of the liquid or gas. In the present invention the liquid (i.e. the tallow) moves into the rendering vessel under a pumping action, though this net inflow of tallow is insufficient in and of itself to suspend and mobilize the particles. Accordingly, the agitator 7 is used to increase the fluid flow (i.e. the tallow flow) in the rendering vessel 6 thereby mobilizing (fluidizing) the unrendered (and partially rendered) particles in the rendering vessel 6.

Therefore, in the process according to the present invention fluidization results in the particulate raw material behaving within the medium of the tallow as a fluid. As a result the particles move freely among themselves with the net result that the suspended and mobilized particles are subjected to high rates of heat and mass transfer. As with any fluidized bed the larger or heavier particles will be toward the bottom of the tank while the lighter or smaller particles will migrate to the top. Consequently, as the larger particles are rendered, i.e. the fat removed therefrom, they will migrate to the upper portion of the tank and will then overflow out of the tank. This means that the correct level of rendering of all particles of raw material is achieved. Due to the fact that the raw material particles are suspended and mobilized within the tallow, then there is efficient particle/liquid contact with the result that relatively large sized particles can be rendered in a comparatively short time. As the particles move from the rendering vessel once they have been rendered, then thermal degradation of the protein does not occur as can be the case in the prior art processes where it is possible for material to remain too long within the rendering vessel. In the preferred form the residence time of the tallow/raw material mixture in the rendering vessel is in the range of approximately 2 to 10 minutes. The temperature in the rendering vessel is controlled in the preferred range of 75° to 95° C.

In the preferred form of the invention control of the rendering process is achieved by sensing the electric current drawn by the agitator as this current is indicative of the viscosity of the mixture in the rendering vessel 6. When the viscosity in the vessel becomes too high for satisfactory fluidization, mixing and heat transfer, control means shut off or reduce the rate of the raw material being pumped into the vessel and increase the rate of input of recycled tallow in order to reduce the viscosity of the tallow/raw material mixture in the rendering vessel.

If additional heating in the rendering vessel 6 is required the vessel can be fitted with a heating jacket to provide extra heat transfer area.

The recycled tallow is low in water content with the content being less than 10%, preferably less than 3% and most preferably 2% and under. This ensures that a minimum of water is added back into the rendering vessel 6.

By means of an overflow pipe 8 the rendered material passes by gravity or is pumped into a suitable separator 9. For example, a three phase co-current decanter centrifuge can be used as this provides a good level of separation. As illustrated in the following examples, the tallow phase derived from such a centrifuge is sufficiently low in water content for a part of the phase to be recycled directly back into the rendering vessel. Alternatively a three phase counter current decanter centrifuge or a two phase decanter centrifuge can be used, however, further separation or polishing of the tallow phase may be necessary before the tallow phase issuing from such separators can be used for recycling into the rendering vessel 6. For example when using a three phase co-current decanter centrifuge the rendered material is separated into a feed stream having: a solids phase 10 with approximately 50–70% water and 6–9% fat; a stickwater phase 11 with approximately 2–3% total solids and 0.04–0.2% fat; and a tallow phase 12 with water approximately in the range of 0.0–10%.

The recycle tallow 14 is preheated in a heat exchanger 13 to a temperature in the range of 80° C. to and then pumped into the rendering vessel 6 at a 95° C. and then pumped into the rendering vessel 6 at a specific tallow/raw material ratio. This tallow to raw material ratio (T:RM) varies with the type of raw material being rendered. For example with a bone/beef trimmings/soft guts mixture having a water content in the range of approximately 50–65% the T:RM is 0.3/1.0 to 0.5/1.0 weight/weight. With beef trimmings only the T:RM is 0.5/1.0 to 1.0/1.0 and with bone only the T:RM is 2.0/1.0 to 3.0/1.0. As stated above, the recycle tallow stream 14 can be derived from the tallow phase issuing from the separator processing the rendered material or can be derived from the polished tallow stream 16.

The solids phase 10 is sterilized if required and dried in a dryer to produce a meal with a residual fat content of 6–9% and 6–10% moisture. The stickwater phase 11 is either dumped to waste or the solids and fat in this stream are recovered by ultrafiltration. When the tallow phase 12 is sufficiently low in water content, part of it is recycled as recycle tallow 14 and the other part is polished through a disc-type centrifugal separator to be stored as polished tallow 16.

The acid, if used in the process to preserve the raw material, can be any acidic substance which includes the following acids: hydrochloric, sulphuric, phosphoric, citric, tannic, oxalic, tartaric, acetic, malic, formic, benzoic, lactic and their water soluble salts. The pH of the raw material by acid addition is adjusted to 3.8 to 4.5. The addition of acid for preservation consequently has a beneficial effect on the separation of fat in the three phase decanter 9; the fat and protein in the stickwater phase is minimized.

Conveying of material to and from individual processing equipment can be by means of either pump, screw conveyors, belt conveyors or pneumatic conveyors or chutes.

Sterilization of the solids phase 10 is carried out in a pressure vessel and drying is carried out in one of the following type driers: direct fired rotary drier, batch or continuous dry rendering cooker, ring drier, fluidized bed or spouted drier, jet drier.

Instead of drying the solids phase 10, the material can by itself or mixed with other ingredients, be canned, frozen or dehydrated to produce a foodstuff for humans or pets.

The plant is illustrated further by the following examples giving operational data:

EXAMPLE 1

5000 kg/h of beef/mutton mixed offal was rendered with 2500 kg/h of recycle tallow phase (ex-three phase decanter). The products from the three phase decanter centrifuge were 2200 kg/h of solids phase with 65% water and 7-5% fat (dry basis); 3300 kg/h of tallow phase with 2% water and 3% fat-free solids and 2000 kg/h of stickwater with 2.8% total solids and 0.06% fat. The free fatty acid content of the tallow produced was 0.6% and the bleachability of the tallow was 0.2 Red.

EXAMPLE 2

3000 kg/h of beef trimmings and mutton soft offal were rendered with 1500 kg/h of polished recycled tallow. The products from the three phase decanter centrifuge were 855 kg/h of solids phase with 69% water and 7% fat (dry basis); 2565 kg/h of tallow phase with 2-5% water and 1% fat-free solids; 1080 kg/h of stickwater with 2.3% total solids and 0.2% fat. The free fatty acid content of the tallow produced was 0.5% and the bleachability of the tallow was 0.3 Red.

The invention thus provides a rendering process in which the amount of material lost in process water is reduced. No water or live steam is introduced into the rendering process. A good level of separation is achieved by use of the three phase decanter after the material has been heated in the rendering vessel.

The process can be carried out in a plant which does not need to have any facility to raise process steam for the purpose of supplying heat to the rendering vessel 6. As disclosed rendering vessel 6 is heated by heat transfer means. The rendering process is carried out at temperatures below 100° C. which, due to lack of thermal degradation, results in the production of high quality tallows and meals.

What is claimed is:

1. A low temperature continuous rendering process for separating animal or vegetable raw material which may include solids into a fat fraction and at least one protein fraction comprising:
    (A) first reducing the particle size of the raw material,
    (B) then feeding the reduced raw material into the lower part of a rendering vessel in the absence of process water and/or steam,
    (C) feeding under pressure into the lower part of the rendering vessel recycled tallow,
    (D) heating the raw material and tallow by the rendering vessel using heat exchange means, to a temperature which is in the range of 75° C. to 100° C.,
    (E) continuously agitating the tallow and raw material to increase the flow rate of the tallow through the rendering vessel for causing the reduced raw material to be subjected to continuous particulate fluidization within the medium of the tallow while resident and in the rendering vessel, and
    (F) moving by overflow means a flow of the heated material from the upper portion of the rendering vessel into a separator for phase separation.

2. The process of claim 1 wherein the residence time of the raw material and tallow in said rendering vessel is in the range of substantially 2 to 10 minutes.

3. The process of claim 1 wherein the viscosity of the raw material and tallow in said rendering vessel is monitored and the ratio of raw material entering the vessel and the rate of addition of recycle tallow is controlled to ensure that fluidization of the raw material within the medium of the tallow is continuously maintained.

4. The process of claim 1 wherein the flow rate of the tallow is increased by subjecting it to agitation by turbine impeller blades rotated within the raw material/tallow mix within the rendering vessel.

* * * * *